US008848015B2

(12) United States Patent
Allegro (10) Patent No.: US 8,848,015 B2
(45) Date of Patent: Sep. 30, 2014

(54) METHOD AND DEVICE FOR PROCESSING TEXT DATA (75) Inventor: Stephane Allegro, Clamart (FR)

(73) Assignee: Orange, Paris (FR)

( * ) Notice: Subject to any disclaimer, the term of this patent is extended or adjusted under 35 U.S.C. 154(b) by 644 days.

(21) Appl. No.: 13/139,417

(22) PCT Filed: Dec. 16, 2009

(86) PCT No.: PCT/FR2009/052559
§ 371 (c)(1),
(2), (4) Date: Jun. 13, 2011

(87) PCT Pub. No.: WO2010/072945
PCT Pub. Date: Jul. 1, 2010

(65) Prior Publication Data
US 2011/0249083 A1 Oct. 13, 2011

(30) Foreign Application Priority Data

Dec. 22, 2008 (FR) ...................................... 08 58907

(51) Int. Cl.
H04N 7/14 (2006.01)
G06F 15/16 (2006.01)
H04L 12/58 (2006.01)
H04L 12/18 (2006.01)
G06F 3/00 (2006.01)

(52) U.S. Cl.
CPC ............ *H04L 12/1827* (2013.01); *G06F 15/16* (2013.01); *H04L 12/58* (2013.01); *G06F 3/00* (2013.01); *H04N 7/147* (2013.01); *H04N 7/141* (2013.01)
USPC ..................................... 348/14.01; 348/14.12

(58) Field of Classification Search
CPC ......... H04N 7/14; H04N 7/141; H04N 7/142; H04N 7/144; H04N 7/147; H04N 7/148; H04N 7/15; H04N 7/152; H04N 7/155; H04N 7/157; H04L 12/1827; H04L 12/58; G06F 15/16; G06F 3/00
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

2001/0032335 A1* 10/2001 Jones ............................ 725/105
2004/0145652 A1 7/2004 Yamauchi et al.
(Continued)

FOREIGN PATENT DOCUMENTS

EP 1 239 652 A1 9/2002
JP 2004-128614 A 4/2004
(Continued)

OTHER PUBLICATIONS

Office Action issued for JP 2011-541556 (Dec. 3, 2013).

*Primary Examiner* — Khai N Nguyen
(74) *Attorney, Agent, or Firm* — Drinker Biddle & Reath LLP (57) ABSTRACT A method is provided for processing text data in a telecommunication context between at least one first terminal and one second terminal, comprising, after a processing device receives text data from the first terminal, generating image data integrating the received text data in order to transmit the image data to at least the second terminal. The invention also relates to a corresponding device and to a call system including such a device.

11 Claims, 5 Drawing Sheets

(56) References Cited

U.S. PATENT DOCUMENTS

| | | | |
|---|---|---|---|
| 2004/0189791 A1* | 9/2004 | Haruki | 348/14.01 |
| 2005/0021625 A1* | 1/2005 | Fujimura et al. | 709/204 |
| 2005/0267761 A1* | 12/2005 | Ueno | 704/277 |
| 2008/0005269 A1 | 1/2008 | Knighton et al. | |
| 2008/0158334 A1* | 7/2008 | Reponen et al. | 348/14.02 |
| 2008/0313550 A1 | 12/2008 | Shiga et al. | |
| 2008/0319550 A1 | 12/2008 | Altarac et al. | |
| 2009/0015653 A1* | 1/2009 | Baek | 348/14.02 |

FOREIGN PATENT DOCUMENTS

| | | |
|---|---|---|
| JP | 2004-235895 A | 8/2004 |
| JP | 2004-274342 A | 9/2004 |
| JP | 2005-222431 A | 8/2005 |

* cited by examiner

METHOD AND DEVICE FOR PROCESSING TEXT DATA

CROSS-REFERENCE TO RELATED APPLICATIONS

This application is the U.S. national phase of the International Patent Application No. PCT/FR2009/052559 filed Dec. 16, 2009, which claims the benefit of French Application No. 08 58907 filed Dec. 22, 2008, the entire content of which is incorporated herein by reference.

FIELD OF THE INVENTION

The invention relates to the field of processing text data, particularly in a context of videoconferencing between multiple users.

BACKGROUND

Conversational videotelephony services have recently experienced strong growth. Such services consist of the combined use of video, audio, and text to hold a conference involving multiple participants.

In addition to traditional audio/video conferencing methods, a discussion functionality ("chat") is necessary for exchanging messages in the form of text data. In a point to point exchange between two participants, there are processes for sending text back and forth independently of the video exchange, for example entering text the client side and sending it off when sentences are completed.

Figure 1A:
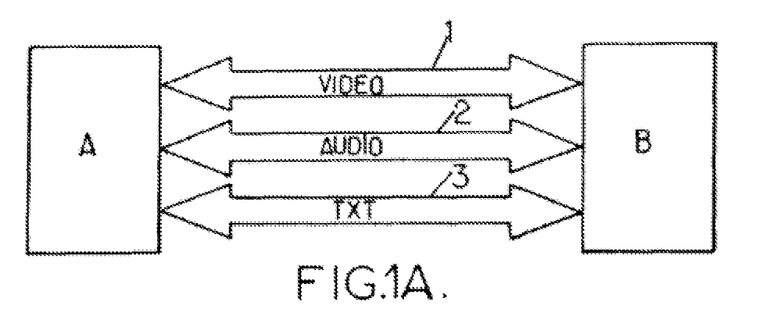
FIGS. 1A, 1B, 1C illustrate different conventional videoconferencing systems with text communication.

An example of such a point to point system is illustrated in FIG. 1A. In this conventional system, the terminals A and B exchange video data over a first exchange channel 1, audio data over a second exchange channel 2, and text data over a third exchange channel 3. The transfer of text data is controlled by a text communication protocol, such as the T.140, SIP Message, or SIP Info protocols.

Figure 1B:
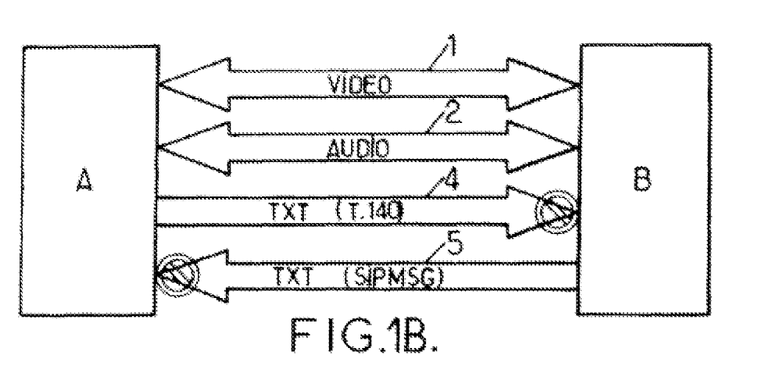

A first problem arises if conducting text conversations between two terminals using different text communication protocols or protocols that are incompatible. This problem is illustrated in FIG. 1B. In this figure, in addition to the usual exchange channels video 1 and audio 2, terminal A for example uses a text data exchange channel 4 managed by a T.140 protocol, while terminal B uses a text data exchange channel 5 managed by a SIP Message protocol. In such a case, terminal B cannot receive the text data on channel 4, and conversely terminal A cannot receive the data on channel 5.

This problem is particularly acute in multipoint videoconferencing systems, where a central control unit manages the videoconference between multiple participants, typically more than three.

Figure 1C:
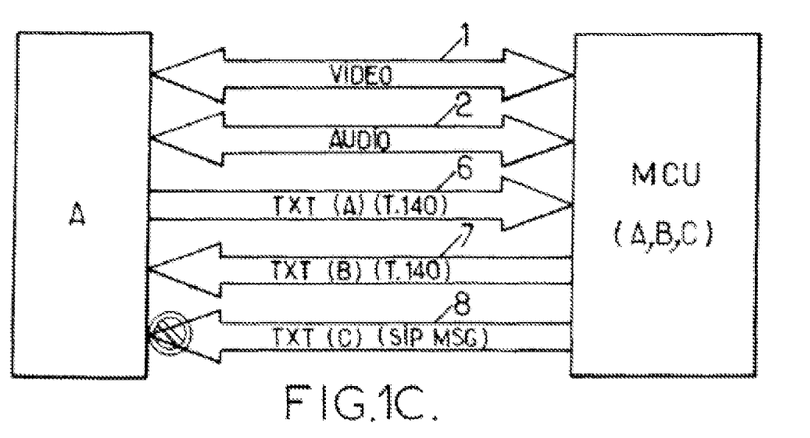

This is illustrated in FIG. 1C. In this figure, in addition to the usual video 1 and audio 2 exchange channels, terminal A uses a text data exchange channel 6 managed by a T.140 protocol. It receives text data from a terminal B on a text data exchange channel 7 managed by the same T.140 protocol, as well as text data from a terminal C on a text data exchange channel 8 managed by the SIP Message protocol. In such a case, the terminal A can communicate textually with terminal B, but is unable to communicate textually with terminal C.

One can see from FIG. 1C that the more participants there are in a multipoint videoconference, the greater the chances of having a problem in exchanging text data, because if any participant uses a different text communication protocol or an incompatible protocol, the text conversation will fail.

In addition, there is no uniformity in the presentation of the text conversation in such a context, and it will depend on the possibilities of each terminal.

Of course, one solution to this problem with holding text conversations during a videoconference between multiple participants, is of course to require each participant to use the same text communication protocol, such as the terminals A and B in FIG. 1C. However, this is an unwieldy constraint to implement, and is sometimes impossible when the terminals of the participants already have their own text communication protocol that cannot be changed. In addition, the terminals of the participants don't know how to receive text data originating from multiple text sources, even if they use the same protocol. Thus most terminals do not support the multipoint text dialog function.

SUMMARY

One of the aims of the invention is to overcome the disadvantages of the above prior art.

To this effect, it proposes a method for processing text data in a telecommunication context between at least one first terminal and one second terminal, comprising, after a processing device receives text data from the first terminal, the generation of image data integrating said received text data in order to transmit the image data to at least the second terminal.

The invention improves the situation, making it possible to hold text conversations in a homogeneous and dynamic manner between multiple parties, from any terminal which supports at least the sending of text data.

The second terminal therefore does not need to use the same text communication protocol as the first terminal in order to receive text data from it.

In addition, the second terminal can now receive several text streams originating from different sources and transferred using the same protocol.

In a preferred embodiment, the processing device embeds at least a portion of the text corresponding to said text data, in at least one source image.

The text data of the first terminal will thus be easily available for the second terminal, simply by viewing the image data received from the processing device.

In an advantageous feature of the invention, the processing device additionally receives text data from the second terminal and embeds in said source image at least a portion of the text corresponding to said text data received from the second terminal.

In this manner it becomes possible to have a conversation without needing to use the same text communication protocol, by simultaneously displaying text data originating from different terminals.

Advantageously, at least a portion of the source image is communicated from the first terminal to the processing device.

In this manner the text information originating from the first terminal will be supplemented by information of a visual nature.

Preferably, the source image is a composite image of which at least a portion is communicated from the second terminal to the processing device.

The text information originating from the terminals will thus be supplemented by information of a visual nature originating from them.

In a first variant, the text data is embedded in a defined display region in said source image.

Such an arrangement of the text allows participants to follow the conversation in an immediate manner.

In another variant, the source image comprises at least a first display region in which is displayed at least a portion of a first image communicated from the first terminal to the processing device, as well as a second display region in which is displayed at least a portion of a second image communicated from the second terminal to the processing device. Such a processing device embeds in the first display region at least a portion of the text corresponding to said text data originating from the first terminal, and embeds in the second display region at least a portion of the text corresponding to said text data originating from the second terminal.

Such an arrangement of the text allows immediately associating the entered text with its author during the conversation.

The invention additionally proposes a device for processing text data in a telecommunication context between at least one first terminal and one second terminal, comprising a processing means able to implement the method as described above.

Advantageously, the processing device comprises a preprocessing means for generating the source image according to the method described above.

Preferably, the preprocessing means comprises a mixing means which generates said source image as a composite image according to the method described above.

The invention also relates to a video-text conversation system comprising a text data processing device as described above, connected to at least two terminals able to send text data and/or image data to the processing device.

Lastly, the invention proposes a computer program for implementing the method as described above. Such a program can be downloadable via a telecommunications network and/or stored in the memory of a processing device and/or stored on a storage medium intended to cooperate with a processing device.

BRIEF DESCRIPTION OF THE DRAWINGS

Other features and advantages of the invention will be apparent from the following detailed description and the accompanying drawings, in which.

DETAILED DESCRIPTION

Figure 2:
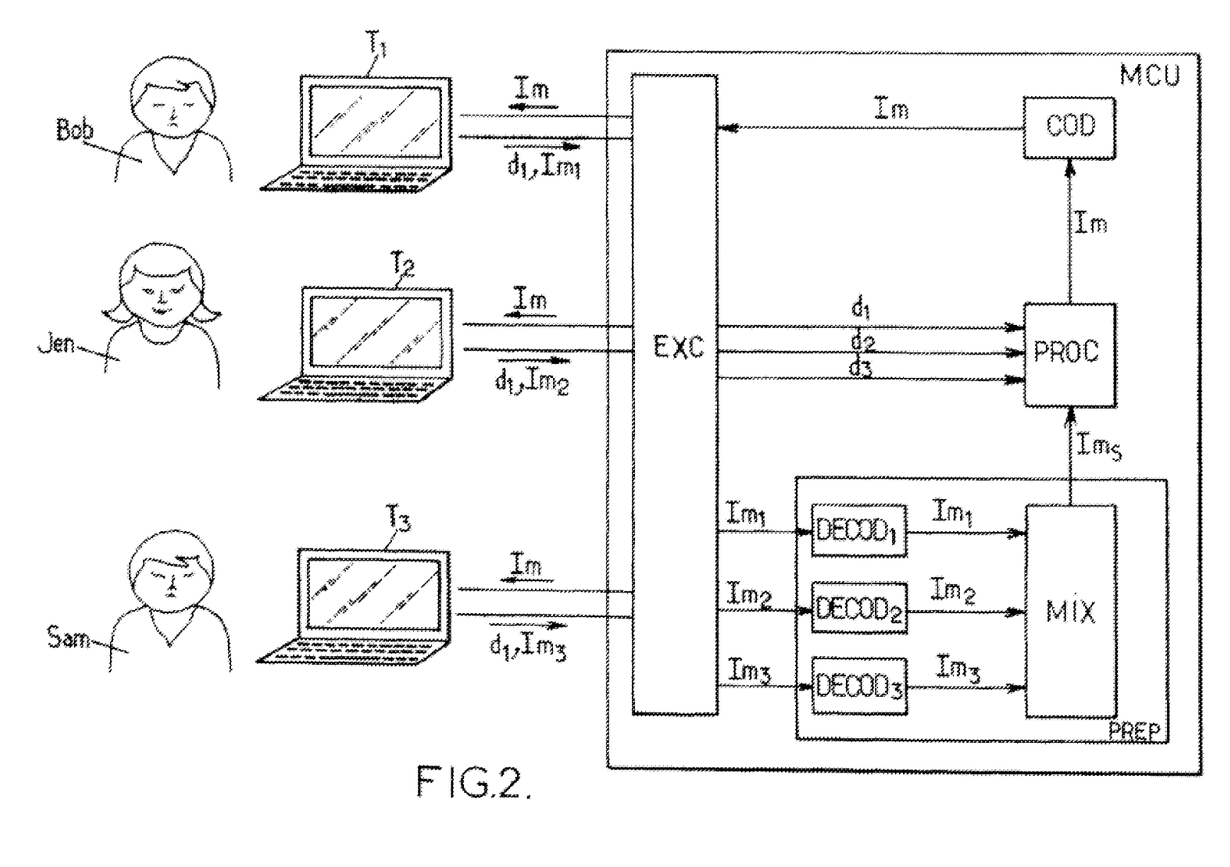
FIG. 2 shows a schematic representation of a text data processing device according to a preferred embodiment of the invention.

First we will refer to FIG. 2, which schematically represents a conversation system comprising a text data processing device MCU in a preferred embodiment of the invention.

In this conversation system, three users Bob, Jen and Sam are conversing through their respective terminals $T_1$, $T_2$ and $T_3$. These terminals are connected to the processing device MCU which, in the example represented, is a Multipoint Control Unit or MCU. The system illustrated in FIG. 2 is used by three users in the example, but of course the invention can apply to any system used by two or more users, each equipped with a terminal connected to the control unit MCU.

The three users Bob, Jen and Sam can enter text data $d_1$, $d_2$, $d_3$ on their respective terminals $T_1$, $T_2$ and $T_3$ and send them to the control unit MCU. Here, "text data" is understood to mean data corresponding to one or more successive characters forming a portion of text, for example characters represented by data coded in ASCII. Such data can be entered on the keyboard of a conventional terminal.

Any text data communication protocol, such as the T.140, SIP message or SIP info protocol, can be used to send the text data between the terminals and the control unit, as long as the protocols used by the different terminals $T_1$, $T_2$ and $T_3$ are recognized by the control unit MCU. The different users therefore do not need to use the same text communication protocol in the present invention.

The control unit MCU receives the text data from at least one terminal, for example $T_1$, and then generates from them, in a processing means PROC, image data Im to be sent to at least one other terminal, for example $T_2$.

Thus, if Bob sends data $d_1$ by means of terminal $T_1$, the control unit MCU generates image data Im to be sent to Jen by means of terminal $T_2$, or possibly also to Sam by means of terminal $T_3$. Preferably, these image data are also sent to terminal $T_1$ so that Bob can verify that his entered data $d_1$ were indeed integrated into the image data Im.

The generation of image data Im can be done, for example, by embedding a portion of text, corresponding to the text data $d_1$, into a portion of a source image $Im_s$. This source image $Im_s$ can be a simple fixed image, for example a completely black image, into which a portion of text corresponding to the text data $d_1$ is embedded as white characters. The source image $Im_s$ may also consist of a succession of images $\{Im_s\}_{1,\ldots,k}$ in a video stream, received for example from a medium outside the control unit MCU and generating such a video stream, such as a televised program for example.

Advantageously, the source image data $Im_s$ come from the users themselves. For example, Bob, Jean and/or Sam can send image data $Im_1$, $Im_2$, $Im_3$, which will be used to embed a portion of text corresponding to the sent text data $d_1$, $d_2$ and/or $d_3$.

In a first example, the terminal $T_1$ sends text data $d_1$, corresponding to text entered by the user Bob, as well as image data $Im_1$, corresponding for example to a photo of this user Bob. The processing means PROC then uses the image data $Im_1$ as the source image data $Im_s$, and embeds in it a portion of the text corresponding to the text data $d_1$ entered by this user Bob. It then generates image data Im corresponding to this photo of the user Bob on which the text he entered appears. These image data are then sent to the user Jen, and for example to other users such as Sam, and possibly also to user Bob as described above.

In another example, the terminal $T_1$ sends text data $d_1$ corresponding to text entered by user Bob, as well as a video stream consisting of a succession of image data $\{Im_1\}_{1,\ldots,k}$ corresponding for example to video captured by a webcam belonging to Bob. The processing means PROC will then successively use the image data $\{Im_1\}_{1,\ldots,k}$ as source image data $\{Im_s\}_{1,\ldots,k}$, in order to embed in each of these images a portion of the text corresponding to the text data $d_1$ entered by user Bob. The processing means PROC then generates a video stream consisting of successive image data $\{Im\}_{1,\ldots,k}$ corresponding to the video captured by the webcam of user Bob on which the text he entered is displayed. This video stream is then sent to user Jen, as well as to other users such as Sam for example, and possibly again to user Bob.

In an exemplary embodiment, the text corresponding to the transmitted text data is embedded character by character as the text data arrives at the control unit MCU. This is "real time" text embedding, occurring as the text data is entered. Such an embedding method offers a high level of interactivity between the participants.

However, one can imagine another means of text embedding, in which the processing means PROC waits to have a complete phrase before displaying it in an image. To achieve such a method of "phrase by phrase" embedding, the processing means PROC can comprise memory, such as a buffer, where the received text data is stored until a data item indicating the end of a phrase (such as the ASCII symbol corresponding to the Enter key of the keyboard) is received. Only then does the processing means PROC process the entire set of stored text data and embed the whole phrase in the source image $Im_s$.

The control unit MCU may of course simultaneously receive text data $d_1$, $d_2$, $d_3$ respectively originating from users Bob, Jen and Sam. In this case, the processing means PROC can embed simultaneously, in real time, the portions of text corresponding to these different data within the same image to be sent out to the various terminals. In the same manner as described above, the processing means PROC can separately store the text data originating from users Bob, Jean and/or Sam, such that it displays the corresponding text only when a complete phrase has been received from that user. This storage can be in a single buffer, common to all users, or in a dedicated buffer for each user.

Advantageously, the different portions of text, corresponding to the different text data $d_1$, $d_2$, $d_3$ received, can be displayed inside one region situated in the center of the source image $Im_s$. The text belonging to the different users can then be differentiated by mentioning a specific data item, such as the last name or first name of the user, in proximity to the text entered by that user. Such an example is illustrated in FIG. 3A.

Figure 3A:
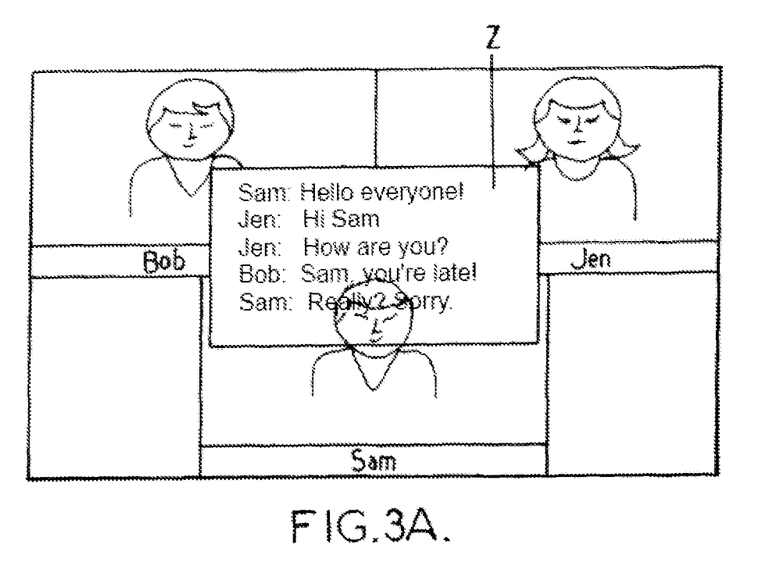
FIGS. 3A, 3B illustrate different methods of presentation of text data and image data according to the invention.

In this example in FIG. 3A where three participants are conversing, the source image $Im_s$ is a composite image formed from three images $Im_1$, $Im_2$, $Im_3$, each representing one of the participants Bob, Jen and Sam. A central region Z of text is superimposed over this composite image to embed the portions of text corresponding to each of the participants. Such a presentation, in addition to being homogeneous, provides a quick view of the conversation simply by glancing at this one central region.

In order to obtain such a composite image, the control unit MCU comprises a preparation means PREP for preparing the source image, receiving image data $Im_1$, $Im_2$ and $Im_3$ from each of the terminals $T_1$, $T_2$, $T_3$. These image data may first be decoded by means of respective decoders $DECOD_1$, $DECOD_2$, $DECOD_3$, in order to eliminate the different types of image encoding used in the transmission from the terminals to the control unit MCU.

These image data $Im_1$, $Im_2$ and $Im_3$ are then sent to a mixing means (MIX) which processes them, for example in order to create a composite source image $Im_s$ showing three images respectively originating from the three terminals $T_1$, $T_2$, $T_3$, for example images of the three different users as illustrated in FIG. 3A. Other effects can be considered, and achieved by the means MIX and PROC, such as animating the most recently received characters in order to achieve a more dynamic effect.

Advantageously, the text entered by the users can be displayed in a region corresponding to their respective image, and not just in a central region. Such an implementation is illustrated in the example in FIG. 3B.

Figure 3B:
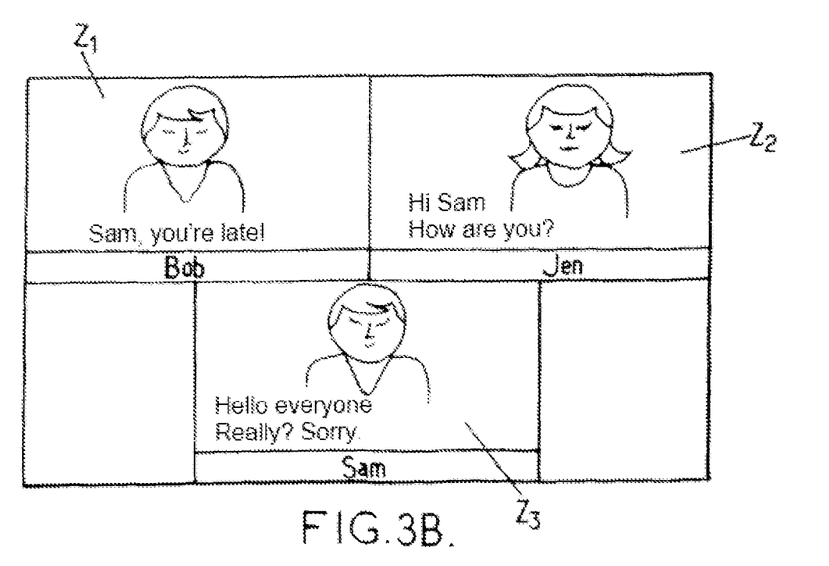

In the example in FIG. 3B, each participant has his own particular region $Z_1$, $Z_2$, or $Z_3$, in which an image or a video stream is displayed which has been sent from the participant's terminal for example, as well as the characters that he entered. This type of presentation also offers, in addition to the advantage of homogeneity, an immediate visual differentiation of which user has entered what text.

Figure 4:
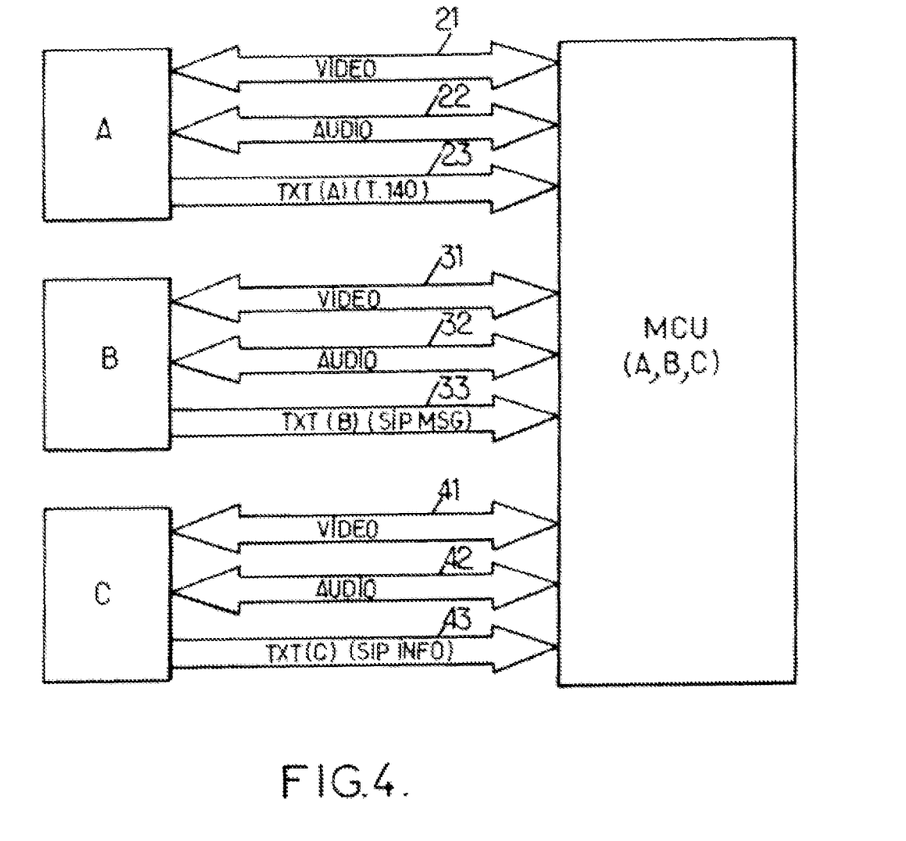
FIG. 4 illustrates a videoconferencing system with text communication in a preferred embodiment of the invention.

FIG. 4 illustrates a videoconferencing system with text communication that uses a control unit MCU in a preferred embodiment of the invention.

In the videoconferencing system with text communication illustrated in FIG. 4, the three users Bob, Jen and Sam use their respective terminals A, B C to communicate with each other through a control unit MCU similar to the one described above.

The terminals A, B, C use video channels 21, 31, 41 and audio channels 22, 32, 42 to organize the videoconference according to established protocols. For the text data, terminal A uses protocol T.140, terminal B uses the SIP Message protocol, and terminal C the SIP Info protocol.

With a conventional multipoint control unit, a text conversation between these different terminals would be impossible because of the different text communication protocols, as was illustrated previously in FIG. 1C. But here, the text channels 23, 33, 43 are only used in the upward direction, i.e. from the terminals to the control unit MCU. The control unit MCU then, in the manner described above, embeds the various text data received from the text channels in a video stream to be resent to the terminals in the downward direction, on video channels 21, 31, 41. The problem of compatibility between the text protocols is thus resolved, as is the problem of receiving multiple text streams from different sources; the text conversation can take place.

Figure 5:
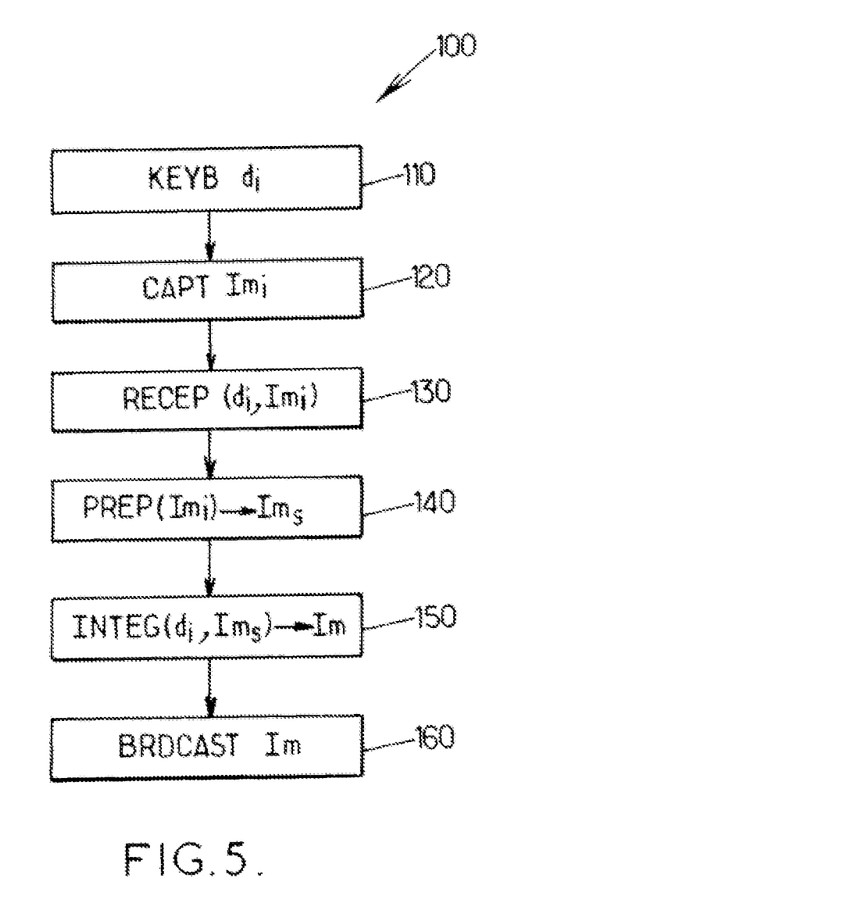
FIG. 5 illustrates the steps of a text data processing method in a preferred embodiment of the invention.

Lastly, FIG. 5 illustrates the steps of a method 100 for processing text data according to a preferred embodiment of the invention.

During a first step 110, text data $d_1$ are entered on at least one terminal $T_1$, by means of a keyboard for example.

Preferably but optionally, source image data $Im_1$ are captured on this same terminal $T_1$ during a second step 120. These data may consist of a single image or even a video stream, and may be captured by means of a webcam for example.

The capture step 120 is indicated as following the text entry step 110 in FIG. 5, but these two steps could just as well occur simultaneously, or in the reverse order where the image data capture step precedes the text data entry step.

The entered text data $d_1$, and possibly the captured image data $Im_1$, are then sent by the terminal $T_1$ and received by the control unit MCU, during a receiving step 130.

Next comes a source image preparation step 140, in which the image data $Im_1$ are processed, formatted in a specific format, or combined with other image data received from other terminals to form a composite source image. This step is done in the preparation means PREP of the control unit MCU. A source image $Im_s$ is thus obtained, or even a stream of source images $\{Im_s\}_{1, \ldots, k}$ composed of a succession of source images.

During an integration step 150, text data $d_1$ are embedded in the previously prepared source image $Im_s$ or stream $\{Im_s\}_{1, \ldots, k}$, in one of the above presentations for example. A corresponding image Im or stream of images $\{Im\}_{1, \ldots, k}$ is obtained.

Once these text data are embedded in a source image or stream of source images, the image Im or the stream of images $\{Im\}_{1, \ldots, k}$ is broadcast to the terminals of the participants in a broadcast step 160, if necessary having been previously encoded by a coding means COD adapted to these terminals.

Of course, the invention is not limited to the embodiment examples represented and described above. Other methods and other embodiments can be devised without departing from the scope of the invention.

The invention claimed is:

1. A method for processing text data in a telecommunication context between at least one first terminal and one second terminal, the method comprising:
    after a processing device receives text data from the first terminal, generating image data integrating said received text data in order to transmit said image data to at least the second terminal,
    embedding, by said processing device, at least a portion of the text corresponding to said text data in at least one source image,
    receiving, by said processing device, text data from the second terminal and embedding in said source image at least a portion of the text corresponding to said text data received from the second terminal, and
    wherein the text data received from the first terminal and the text data received from the second terminal are received according to a different protocol.

2. The method of claim 1, further comprising communicating at least a portion of the source image from the first terminal to the processing device.

3. The method of claim 2, wherein the source image is a composite image of which at least a portion is communicated from the second terminal to the processing device.

4. The method of claim 1, further comprising embedding the text data in a defined display region in said source image.

5. The method of claim 2, wherein the source image comprises at least a first display region in which is displayed at least a portion of a first image communicated from the first terminal to the processing device, as well as a second display region in which is displayed at least a portion of a second image communicated from the second terminal to the processing device, wherein said processing device embeds in the first display region at least a portion of the text corresponding to said text data originating from the first terminal, and embeds in the second display region at least a portion of the text corresponding to said text data originating from the second terminal.

6. A text data processing device for processing data in a telecommunication context between at least one first terminal and at least one second terminal, wherein the text data processing device comprises a processor for, when text data is received from said at least one first terminal, generating image data integrating said received text data, in order to send said image data to said at least one second terminal,
    wherein said processor is able to embed at least a portion of the text corresponding to said text data in at least one source image, in order to generate said image data,
    wherein said processor is additionally able to embed in said at least one source image at least a portion of the text corresponding to text data received from said at least one second terminal, in order to generate said image data, and
    wherein the text data received from said at least one first terminal and the text data received from said at least one second terminal are received according to a different protocol.

7. The text data processing device of claim 6, wherein it comprises a preprocessor for generating said source image from image data received from said at least one first terminal.

8. The text data processing device of claim 7, wherein the preprocessor comprises a mixer for generating said source image as a composite image of which at least a first portion is generated as a function of image data received from said at least one first terminal and at least a second portion is generated as a function of image data received from said at least one second terminal.

9. A video-text conversation system comprising a text data processing device according to claim 6, connected to at least two terminals able to send text data to said text data processing device.

10. A video-text conversation system comprising a text data processing device according to claim 7, connected to at least two terminals able to send text data and image data to said text data processing device.

11. A non-transitory computer program product comprising a computer program for processing, on a processor text, data in a telecommunication context between at least one first terminal and one second terminal, said computer program being stored in at least one of a memory of a processing device, said computer program comprising instruction codes for generating, after a processing device receives text data from the first terminal, image data integrating said received text data in order to transmit said image data to at least the second terminal,
    wherein for embedding at least a portion of the text corresponding to said text data, in at least one source image,
    and for receiving text data from the second terminal and embeds in said source image at least a portion of the text corresponding to said text data received from the second terminal,
    wherein the text data received from the first terminal and the text data received from the second terminal are received according a different protocol.

* * * * *